(12) United States Patent
Karthikeyani et al.

(10) Patent No.: US 9,616,408 B2
(45) Date of Patent: Apr. 11, 2017

(54) ADSORBENT FOR REMOVAL OF CON-CARBON AND CONTAMINANT METAL PRESENT IN HYDROCARBON FEED

(71) Applicant: Indian Oil Corporation Limited, Mumbai, Maharashtra (IN)

(72) Inventors: Arumugam Velayutham Karthikeyani, Faridabad (IN); Mohan Prabhu Kuvettu, Fairdabad (IN); Biswanath Sarkar, Faridabad (IN); Gadari Saidulu, Faridabad (IN); Shiba Prasad Choudhury, Faridabad (IN); Sudhir Kumar Pande, Faridabad (IN); Arvind Mahant, Faridabad (IN); Brijesh Kumar, Faridabad (IN); Santanam Rajagopal, Faridabad (IN); Ravinder Kumar Malhotra, Faridabad (IN); Velusamy Chidambaram, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 135 days.

(21) Appl. No.: 14/415,534

(22) PCT Filed: Aug. 17, 2013

(86) PCT No.: PCT/IB2013/056697
§ 371 (c)(1),
(2) Date: Jan. 16, 2015

(87) PCT Pub. No.: WO2014/027336
PCT Pub. Date: Feb. 20, 2014

(65) Prior Publication Data
US 2015/0158014 A1 Jun. 11, 2015

(30) Foreign Application Priority Data

Aug. 17, 2012 (IN) ............... 2387/MUM/2012

(51) Int. Cl.
*B01J 20/30* (2006.01)
*B01J 20/10* (2006.01)
(Continued)

(52) U.S. Cl.
CPC .......... *B01J 20/3064* (2013.01); *B01J 20/10* (2013.01); *B01J 20/103* (2013.01); *B01J 20/12* (2013.01);
(Continued)

(58) Field of Classification Search
None
See application file for complete search history.

(56) References Cited

U.S. PATENT DOCUMENTS

| | | |
|---|---|---|
| 2,375,641 A | 5/1945 | Garrison |
| 4,325,846 A * | 4/1982 | Shibata .............. B01D 17/0202 502/62 |

(Continued)

*Primary Examiner* — Melvin C Mayes
*Assistant Examiner* — Michael Forrest
(74) *Attorney, Agent, or Firm* — Maschoff Brennan

(57) ABSTRACT

The present invention provides an adsorbent for removal of con-carbon and contaminant metals in feed, said adsorbent composition consisting of clay in the range of 30-70 wt. % and silica in the range of 70-30 wt. %, wherein the adsorbent has a pore volume in the range of 0.25-0.45 cc/gm; a pore size in the range of 20 to 2000 Å and a bi-modal pore size distribution characteristics, with a maximum of about 32% of the adsorbent having a pore size in the range of 20-200 Å and a minimum of about 68% of the adsorbent having a pore size in the range of 200-2000 Å. The present invention also provides a process for preparing the said adsorbent.

13 Claims, 1 Drawing Sheet

(51) Int. Cl.
*B01J 20/28* (2006.01)
*C10G 11/18* (2006.01)
*C10G 55/06* (2006.01)
*C10G 25/03* (2006.01)
*B01J 20/12* (2006.01)

(52) U.S. Cl.
CPC ... *B01J 20/28071* (2013.01); *B01J 20/28078* (2013.01); *B01J 20/28085* (2013.01); *B01J 20/28092* (2013.01); *B01J 20/3085* (2013.01); *C10G 11/18* (2013.01); *C10G 25/03* (2013.01); *C10G 55/06* (2013.01); *B01J 20/3007* (2013.01); *C10G 2300/708* (2013.01)

(56) References Cited

U.S. PATENT DOCUMENTS

| | | |
|---|---|---|
| 4,465,588 A | 8/1984 | Occelli et al. |
| 4,650,564 A | 3/1987 | Occelli et al. |
| 4,956,075 A | 9/1990 | Angevine et al. |
| 5,221,648 A * | 6/1993 | Wachter .......... B01J 29/06 502/64 |
| 7,008,896 B2 | 3/2006 | Stamires et al. |
| 7,993,623 B2 | 8/2011 | Francis et al. |

* cited by examiner

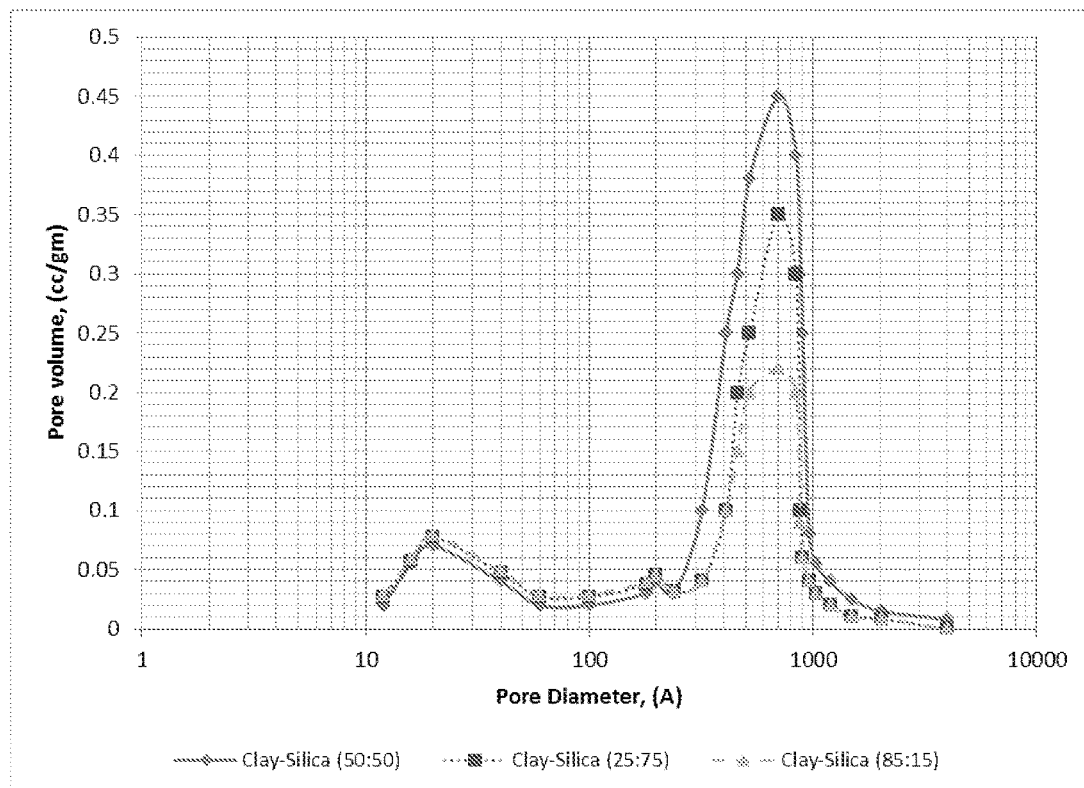

ADSORBENT FOR REMOVAL OF CON-CARBON AND CONTAMINANT METAL PRESENT IN HYDROCARBON FEED

FIELD OF THE INVENTION

The present invention relates to an adsorbent composition. More particularly, the present invention provides a neutral adsorbent composition for removal of con-carbon and contaminant metals in feed, process for preparing the same and use thereof.

BACKGROUND OF THE INVENTION

Fluid Catalytic Cracking (FCC) is one of the largest secondary refining processes which employ most sophisticated zeolite based catalysts. With the increasing crude prices, refiners have been processing heavier feeds sourced from heavy vacuum gas oil, atmospheric bottom, coker naphtha containing metals ranging from 10-200 ppm and con-carbon up to 10 wt %. However, while processing of heavy feeds, catalyst can accumulate significant amount of metals.

Presence of contaminant metals on FCC catalysts is known to affect activity and selectivity. Though high metal tolerant catalysts are available in the market, for maintaining conversion, catalyst make-up rate is higher. Though polyaromatic con-carbon temporarily reduces activity while major activity can be restored by burning off coke, high temperature of exothermic coke combustion can permanently impair the activity of the catalyst.

The contaminant metals such as vanadium and sodium are known to permanently damage the key component of catalyst such as zeolite and matrix through reacting with framework aluminum, structure stabilizing rare earth components. Besides, vanadium metals are known to migrate from particle to particle at high temperature above 670° C. resulting in crippling of catalytic activity of even freshly added catalyst also. Nickel, although may not harm the structure of catalyst however, it is known to dehydrogenate valuable hydrocarbons during cracking reactions. This will result in significant increase in the amount of coke and dry gas. In view of this, catalyst replacement is most preferred in spite of being an expensive option.

U.S. Pat. No. 4,465,588 and U.S. Pat. No. 4,650,564 disclosed improvement of catalytic cracking of high metals content feed stocks such as, for example, those containing iron, vanadium nickel and copper by contacting said feed stocks under defined catalytic cracking conditions with a novel catalyst composition comprising a solid cracking catalyst and a controlled concentration of a diluents comprising alumina to increase gasoline yield and conversion. The concentration of nickel, vanadium and iron contaminants on said catalyst composite is in the range of 4000 to 20000 ppm and achieved following results with Kuwait gas oil (CCR-0.23 wt %, 260-427° C. cut). Although this patent has claimed that their alumina diluents can increase the conversion from (28-57) vol % to (54-70) vol %, however the same is a very low conversion if converted into wt % term in comparison to available prior art.

U.S. Pat. No. 7,008,896 is directed to a process for the preparation of crystalline anionic clay-containing bodies from sources comprising a trivalent metal source (aluminium, gallium, indium, iron, chromium, vanadium, cobalt, manganese, cerium, niobium and lanthanum) and divalent metal source (magnesium, zinc, nickel, copper, iron, cobalt, manganese, calcium, and barium) for the removal of SOx and/or NOx compound in FCC.

U.S. Pat. No. 4,956,075 describes the use of a catalyst containing Mn, a large pore crystalline molecular sieve, and optionally rare earth in catalytic cracking is disclosed. This catalyst gives high gasoline selectivity with low coke yields and is suitable for either gas oil or residue cracking applications.

Composition and methods disclosed in U.S. Pat. No. 7,993,623 B2 for removing poisonous metals from hydrocarbons comprise hydrotalcite having one or more trapping metals dispersed on the outer surface to increase gasoline yield, reduction of bottom and coke yields. The above samples are checked with metal level of nickel 3000 ppm and vanadium 3000 ppm only.

In light of the existing processes, there still exists a need to develop a composition for removal of metal and other contaminants from hydrocarbon feeds containing higher concentration of the contaminants.

SUMMARY OF INVENTION

Accordingly, the present invention provides an adsorbent for removal of con-carbon and contaminant metals in feed, said adsorbent consisting of:

(a) clay in the range of 30-70 wt. %; and (b) silica in the range of 70-30 wt. %, wherein the adsorbent has a pore volume in the range of 0.25-0.45 cc/gm; a pore size in the range of 20 to 2000 Å; and a bi-modal pore size distribution characteristics, with a maximum of about 32% of the adsorbent having a pore size in the range of 20-200 Å and a minimum of about 68% of the adsorbent having a pore size in the range of 200-2000 Å.

The present invention also provides a process for preparing an adsorbent consisting of 30-70 wt. % of clay and 70-30 wt. % of silica, wherein the adsorbent has a pore volume in the range of 0.25-0.45 cc/gm; a pore size in the range of 20 to 2000 Å; and a bi-modal pore size distribution characteristics, with a maximum of 32% of the adsorbent having a pore size in the range of 20-200 Å and a minimum of 68% of the adsorbent having a pore size in the range of 200-2000 Å, said process comprises the steps of:

(a) preparing a silica sol by adding source of silica to an acid under controlled temperature and pH, (b) preparing clay slurry by adding demineralized water contains dispersant;

(c) adding a clay material to the silica sol so as to obtain a clay-silica slurry;

(d) adding a pore regulating agent to the clay-silica slurry and forming shaped microsphere/extrudate from the same; and (e) processing the shaped microsphere/extrudate so as to remove the pore regulating agent therefrom to thereby obtain the adsorbent.

The present invention further provides that the adsorbent is used for removal of con-carbon and metals present in the feed from 10 wt % and 10-200 ppm.

The above and other aspects of the present invention are further attained and supported by the following embodiments described herein. However, the described embodiments are in accordance with the best mode of practice and the scope of the invention is not restricted to the described embodiments herein after.

BRIEF DESCRIPTION OF DRAWING

FIG. 1 shows distinct bi-modal pore size distribution result of Clay-Silica (50:50) vis-à-vis Clay-Silica (25:75) & Clay-Silica (85:15).

DETAILED DESCRIPTION OF INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The present invention discloses an adsorbent which can selectively adsorb metal contaminants and con-carbon from hydrocarbon feeds. The hydrocarbon feeds according to the invention contains very high concentrations of metals such as nickel, vanadium, sodium, iron and so forth. The adsorbent used is a neutral inorganic composition. Following removal, soft feed can be cracked over zeolitic FCC catalyst.

In accordance with the present invention the neutral adsorbent comprises of clay from 30-70%, silica from 70-30% and is prepared by employing a volatile pore regulating template. Further, the adsorbent is suitable for removal of con-carbon and metals present in the feed from 10 wt % and 10-200 ppm.

According to the invention, the adsorbent has a microspheroidal shape with particle size ranging from 20-150 microns or is an extrudate with cross-section 0.5 mm to 3 mm or any other suitable required form.

The adsorbent has pore volume from 0.25-0.45 cc/gm with a maximum of about 32% of the adsorbent having a pore size in the range of 20-200 Å and a minimum of about 68% of the adsorbent having a pore size in the range of 200-2000 Å.

Further, the invention provides a process for preparation of the adsorbent. The adsorbent is prepared by, selecting a silica based binder sourced from sodium silicate both neutral and alkaline, silicic acid, sodium or ammonium stabilized colloidal silica, pore regulating agent sourced from acrylamide polymer, propylene oxide polymer, ethylene oxide polymer, polyvinyl alcohol, C12-C25 surfactants, clay sourced from kaolinite, bentonite, illite, vermiculite, smectite or dolomite, selecting a acid from sulfuric acid, nitric acid, hydrochloric acid, formic acid and producing a silica sol by, addition of silica source to a dilute acid under controlled temperature between 10-30° C. under vigorous mixing conditions with pH below 3, adding a clay material and finally adding pore regulating agent to obtain a fine slurry with solid content ranging from 15-45 wt %. The slurry is further processed to prepare the adsorbent in various forms such as microspheres, extrudates and so forth.

Accordingly, the present invention provides an adsorbent for removal of con-carbon and contaminant metals in feed, said adsorbent consisting of:
(a) clay in the range of 30-70 wt. %; and
(b) silica in the range of 70-30 wt. %,
wherein the adsorbent has a pore volume in the range of 0.25-0.45 cc/gm; a pore size in the range of 20 to 2000 Å; and a bi-modal pore size distribution characteristics, with a maximum of about 32% of the adsorbent having a pore size in the range of 20-200 Å and a minimum of about 68% of the adsorbent having a pore size in the range of 200-2000 Å.

In one embodiment of the present invention, the clay is in the range of 35-65 wt. %, and silica is in the range of 65-35 wt. %. Most preferably the clay is in the range of 40-50 wt. %, and silica is in the range of 60-50 wt. %.

In another embodiment of the present invention, a maximum of 30% of the adsorbent have a pore size in the range of 20-200 Å and a minimum of 70% of the adsorbent having a pore size in the range of 200-2000 Å.

In yet another embodiment of the present invention, the silica is selected from a group comprising of sodium silicate both neutral and alkaline, silicic acid, sodium or ammonium stabilized colloidal silica, or combination thereof.

In still an embodiment of the present invention, the clay is selected from a group comprising of kaolinite, bentonite, illite, vermiculite, smectite, dolomite, or combination thereof.

The present invention also provides a process for preparing an adsorbent consisting of 30-70 wt. % of clay and 70-30 wt. % of silica, wherein the adsorbent has a pore volume in the range of 0.25-0.45 cc/gm; a pore size in the range of 20 to 2000 Å; and a bi-modal pore size distribution characteristics, with a maximum of 32% of the adsorbent having a pore size in the range of 20-200 Å and a minimum of 68% of the adsorbent having a pore size in the range of 200-2000 Å, said process comprises the steps of:
(a) preparing a silica sol by adding source of silica to an acid;
(b) preparing clay slurry by adding demineralized water contains dispersant;
(c) adding a clay material to the silica sol so as to obtain a clay-silica slurry;
(d) adding a pore regulating agent to the clay-silica slurry and forming shaped microsphere/extrudate from the same; and
(e) processing the shaped microsphere/extrudate so as to remove the pore regulating agent therefrom to thereby obtain the adsorbent.

In yet another embodiment of the present invention, the pore regulating agent is selected from a group comprising of acrylamide polymer, propylene oxide polymer, ethylene oxide polymer, polyvinyl alcohol, C12-C25 surfactants or combination thereof.

In still an embodiment of the present invention, the acid is selected from a group comprising of sulfuric acid, nitric acid, hydrochloric acid, formic acid or combination thereof.

In yet another embodiment of the present invention, the silica sol is prepared by adding source of silica to an acid under controlled temperature between 10-30° C. with pH below 3.

The present invention further provides that the adsorbent is used for removal of con-carbon and metals present in the feed from 10 wt % and 10-200 ppm.

For residue feed applications pore size distribution of matrix component requires a special attention. Therefore the current invention has targeted with the different matrix structures. Current adsorbent has a macro pores 200-2000 Å to allow deposition of metals & CCR and to assist in the further cracking of large asphalting molecules. Although this macro pores have a low activity (conversion about 30-40 wt %) due to silica-based matrix possessing a weak acidity, but they act as a guide for large molecules to access active sites in microspores (20-50 Å). Sufficient meso porosity (20-200 Å) has also been maintained in the adsorbent to ensure cracking of the naphthenic structures and alkyl substituent from aromatic rings, whereas micro porosity is necessary to crack straight alkyl chains.

The optimal amount and type of silica matrix was selected to provide adequate resistance to deactivation by metals, particularly by V and Ni. Clay was added to provide desirable density of the catalyst as well as to passivate the detrimental effect of Ni & V.

Also in the current invention a correlation has been made/maintained between the pore volume and the matrix surface area for optimizing the catalyst performance for different residues. Overall the adsorbent removes the CCR & metals simultaneously and thereby increase the life of cracking catalyst. The content of CCR in the feed may be an indication of the presence of metals in the feed, i.e., higher content of CCR higher content of metals.

There are two main constraints during the operation of the FCC/RFCC units while handling heavier hydro carbon feedstock, i.e., the activity limited conversion and delta-coke (the difference between the amount of coke on spent catalyst entering the regenerator and that on the regenerated catalyst exiting the regenerator and entering the riser) limited conversion.

The former reflects the limitation in conversion and/or yield of the unwanted gaseous products in the riser, as well as a higher coke formation due to low catalyst activity. This problem can be alleviated either by using a more active catalyst or changing the catalyst/feed ratio.

The delta coke limitations reflect the situation in regenerator caused by the excessive amount of coke deposited on catalyst in the riser. The increased values of delta-coke require larger air supply to regenerator which may cause unwanted temperature excursion. This problem can be controlled in the riser-reactor either by decreasing the dehydrogenation activity of catalyst (due to Ni) or by increasing the catalyst/feed ratio.

The large pore adsorbent can remove metal (particularly Ni & V) and CCR present in the heavier hydrocarbon feedstock and make the feedstock free from contaminants, which indirectly increase the life of cracking catalyst. Also the silica-clay based adsorbent is cheaper in cost.

The following non-limiting examples illustrate in details about the invention. However, they are, not intended to be limiting the scope of present invention in any way.

Example 1

Preparation Procedure for Making Adsorbent Clay-Silica (50:50)

290 g of clay (loss on ignition 14.19 wt. %) was slurried in 300 g of demineralised water (DM) which contained 0.5 wt % dispersant (Tamol) and kept under stirring. 12 gms Formic acid (dilute acid) was added into 100 ml of DM water. Silica sol was prepared by adding 833 g of ammonium polysilicate (30 wt. % $SiO_2$) to the dilute acid under controlled temperature between 10-30° C. under vigorous mixing conditions with pH below 3, which was kept under stirring for 30 minutes. The prepared Silica sol was added to the clay slurry. Then 2 g of pore regulating agent in 100 ml DM water was added to the Clay-Silica slurry and the final slurry with a solid content of 35 wt % was spray dried and the fraction between 20-120 microns with an average particle size of 85 microns was separated for further study. The calcined product was tested for ABD and attrition index, which were measured respectively as 0.85 g/ml and 3.0.

Example-2

Process for Preparing Spray Dried Adsorbent in the Shape of Microsphere

The slurry with a solid content ranging from 15-45 wt % is spray dried to produce microspheres in particle size range 20 to 150 microns. As the microspheres may contain significant amount of sodium salts, spray dried microspheres are washed off sodium by dispersing in hot demineralised water in temperature range 40-100° C. Washed microspheres are then flash dried and calcined for further application as an adsorbent. The final product has silica in the range 30-70 wt %, alumina in the range 10-50 wt % and residual sodium <0.5 wt %. Thus produced microspheres have average particle size in the range 20-150 microns, ABD (Apparent Bulk Density) in the range 0.65 to 0.95 g/cc and exhibit attrition index below 6. Calcined microspheres when analysed showed pore volume in the range 0.25 to 0.45 cc/gm occupying 20-200 Å pores 25% of pore volume and 200-2000 Å pores occupying 75% of pore volume.

Example-3

Procedure for Preparing Adsorbent in the Shape of Extrudates

The pH of free flowing slurry prepared was raised above 3.5 and held for 3-12 hrs to form a gel. This gel was extruded to desired shape and dried in an oven. The dried extrudates were washed off sodium to a concentration below 0.5 wt % and calcined for use as adsorbent.

Effect of Pore Regulating Agents on Pore Volume of Adsorbent:

TABLE 1

Table-1: Identification of proper pore regulating agent:
Clay = 50 wt %
Silica = 50 wt %

| Pore Regulating agent | Concentration, wt % | Pore volume, cc/gm |
|---|---|---|
| $C_{12}$-$C_{25}$ surfactants | 6 | 0.45 |
| $C_{12}$-$C_{25}$ surfactants | 6 | 0.41 |
| Ethylene oxide polymer | 6 | 0.3 |
| propylene oxide polymer | 6 | 035 |

TABLE 2

Table-2: Optimization of Pore regulating agent:

| | Clay Wt % | Silica Wt % | Pore regulating agent (I), Wt % | Pore volume Cc/gm |
|---|---|---|---|---|
| 1 | 50 | 50 | 2 | 0.34 |
| 2 | 50 | 50 | 3 | 0.37 |
| 3 | 50 | 50 | 4 | 0.4 |
| 4 | 50 | 50 | 6 | 0.45 |

TABLE 3

Table-3: Optimization of Adsorbent composition:

| | Clay Wt % | Silica Wt % | Pore regulating agent (I), Wt % | Pore volume Cc/gm | Pore size ° A |
|---|---|---|---|---|---|
| 1 | 85 | 15 | 6 | 0.22 | 20-200 = 35% |
| | | | | | 200-2000 = 65% |
| 3 | 70 | 30 | 6 | 0.28 | 20-200 = 32% |
| | | | | | 200-2000 = 68% |
| 4 | 50 | 50 | 6 | 0.45 | 20-200 = 25% |
| | | | | | 200-2000 = 75% |

TABLE 3-continued

Table-3: Optimization of Adsorbent composition:

| | Clay Wt % | Silica Wt % | Pore regulating agent (I), Wt % | Pore volume Cc/gm | Pore size ° A |
|---|---|---|---|---|---|
| 5 | 40 | 60 | 6 | 0.38 | 20-200 = 30% 200-2000 = 70% |
| 6 | 25 | 75 | 6 | 0.35 | 20-200 = 35% 200-2000 = 65% |

Distinct bi-modal pore size distribution observed and that can be seen in the FIG. 1. The first is narrow distribution and in the range 20-200 Å. The second distribution covers a broad range from 200 to about 2000 Å, with the peak lying in the range of 300-1000 Å. On a total pore volume basis, 20-200 Å is about 25% & 200-2000 Å is about 75%. The decrease in clay content i.e. Clay-Silica (25:75) & increase in clay content (85:15) shows 20-200 Å is about 35% & 200-2000 Å is about 65%.

Example-4

This example explains the properties of spray dried micro sphere samples at maximum metal level (Ni-15000 ppm & V-30000 ppm) prepared as per procedure mentioned in example-2 above and is given in Table-4. The adsorbent was first metal doped by conventional Mitchel method (Ref: B R Mitchell "Metal contaminants of catalytic cracking" Ind Eng Chem Prod Res & Dev 209, 19, 1980) at required nickel and vanadium levels. Then samples were reduced with partial pressure hydrogen to bring the metals in reduced state and steamed at temperature of 788 deg.C. for 3 hours using 100% steam. The surface area achieved in the range of 37-64 m²/gm and pore volume in the range of 0.25-0.45 gm/cc.

TABLE 4

Table-4: Properties of adsorbent

| Properties | Adsorbent-A Fresh | Adsorbent-B Metal doped | Adsorbent-C Metal doped | Adsorbent-D Metal doped |
|---|---|---|---|---|
| Metal on Adsorbent, ppm | | | | |
| Ni | 0 | 4000 | 10000 | 15000 |
| V | 0 | 10500 | 20000 | 30000 |
| Surface area, m2/gm | 63.36 | 54.26 | 46.49 | 37.90 |
| Pore volume, cc/gm | 0.45 | 0.37 | 0.29 | 0.25 |

Micro Activity Test (MAT):

The steamed adsorbent (fresh and metal doped) was subjected to CCR (canradson carbon residue) and metal removal study in ACE R+MAT unit under the typical conditions as shown in Table-5. After removing CCR & metal the product was subjected to activity test in Fixed Bed Auto MAT unit under the typical conditions as shown in Table-5. Coke on catalyst is determined by in-situ regeneration with fluidized air by heating at 660° C. The gas sample is analyzed with online micro GC. The H2, C1, C2, C3, C4 and C5 lump is determined quantitatively. The liquid products are analyzed by ASTM 2887 procedure in a simulated distillation analyzer, Perkin Elmer. The percentage of the liquid products boiling in the range of gasoline (C5-150° C.), heavy naphtha (C150-216° C.), Light Cycle Oil (C-216° C.-370° C.) and Clarified Oil (370° C.+) is calculated. Carbon on catalyst was determined by online IR analyzer.

TABLE 5

Table-5: Reaction conditions used in micro reactor experiment

| Conditions | ACE R+ unit | Fixed bed Auto MAT unit |
|---|---|---|
| Weight of catalyst loaded, gms | 6-12 | 2.5-3.5 |
| Feed Injection time, sec | 30-45 | 10-75 |
| Reactor temperature, ° C. ° | 450-550 | 500-650 |
| Feed rate, gm/min | 1.5-3.5 | 1.5-6 |

TABLE 6

Table-6: Properties of feedstock used in the current invention

| Properties | Feed-1 | Feed-2 | Feed-3 (Cracked product from Feed-2) |
|---|---|---|---|
| Density, gm/cc | 0.946 | 0.9053 | — |
| CCR, wt % | 5.86 | 10.37 | 0.19 |
| Metal, ppm | | | |
| Nickel | <1 | 15 | <1 |
| Vanadium | <1 | 51 | <1 |
| PONA, wt % | | | |
| Aromatic | 40.74 | 32 | — |
| Saturates | 59.26 | 68 | — |
| Sulfur, wt % | 0.28 | 2.48 | 0.02 |

Table-7: Performance Evaluation of Clay-Silica (50:50) Vis-à-Vis Clay-Silica (25:75) & Clay-Silica (85:15) to Check the CCR Removal Capability:

The prepared Clay-Silica samples without metal were evaluated in ACE R+ unit under ROT of 550° C. and cat/oil 5.0 with respect to feed stock-1. The products were analyzed as per the procedure described in the section Micro Activity Test (MAT). The product was also analyzed for CCR & metal content in it. This example illustrates the cracking and CCR & metals (Ni&V) removable capability of various Clay-Silica samples.

TABLE 7

| | Description | | |
|---|---|---|---|
| | Feed-1 | Feed-1 | Feed-1 |
| | Adsorbent | | |
| | Clay-Silica (50:50) | Clay-Silica (25:75) | Clay-Silica (85:15) |
| Metal on catalyst, ppm | | | |
| Ni | Nil | Nil | Nil |
| V | Nil | Nil | Nil |
| Temperature, deg. C. | 550 | 550 | 550 |
| WHSV, hr−1 | 24 | 24 | 24 |
| Cat/Oil | 5.0 | 5.0 | 5.0 |
| Yield, wt % | | | |
| Hydrogen | 0.09 | 0.04 | 0.05 |
| Dry gas | 1.08 | 1.7 | 1.22 |
| LPG | 9.83 | 3.21 | 2.34 |
| Gasoline (C5-150 deg. C.) | 14.50 | 10.22 | 5.05 |
| Heavy naphtha (150-216 deg. C.) | 6.82 | 5.13 | 3.85 |
| Light cycle oil (216-370 deg. C.) | 23.78 | 22.23 | 18.51 |
| Clarified oil (370 deg. C.+) | 31.30 | 46.44 | 56.98 |
| Coke | 12.60 | 11.03 | 12 |

TABLE 7-continued

| | Description | | |
|---|---|---|---|
| | Feed-1 | Feed-1 Adsorbent | Feed-1 |
| | Clay-Silica (50:50) | Clay-Silica (25:75) | Clay-Silica (85:15) |
| −216 deg. C. Conversion | 44.92 | 31.33 | 24.51 |
| CCR, wt % | 0 | 0.78 | 1.25 |

Adsorbent Clay-Silica shows zero CCR in the liquid sample when compare to Clay-Silica 25:75 (0.78 wt %) & Clay-Silica 85:15 (1.25 wt %).

Table-8: Performance Evaluation of Clay-Silica (50:50) Vis-à-Vis Clay-Alumina-$La_2O_3$:

The prepared Clay-Silica (50:50) sample & Clay-Alumina-$La_2O_3$ sample without metal were evaluated in ACE R+ unit under ROT of 550° C. and cat/oil 5.0 with respect to feed stock-1. The products were analyzed as per the procedure described in the section Micro Activity Test (MAT). The product was also analyzed for CCR & metal content in it.

TABLE 8

| | Catalyst Name | |
|---|---|---|
| | ADSORBENT Clay-Silica (50:50) | Clay-Alumina-$La_2O_3$ (w/o pore regulating agent) |
| Feed I.D. | Feed-1 | Feed-1 |
| Cracking Temperature, ° C. | 550 | 550 |
| Injection Time, sec | 30 | 30 |
| Catalyst-to-Oil, wt/wt | 5.00 | 5.00 |
| YIELDS, wt %: | | |
| Hydrogen | 0.09 | 0.1 |
| Dry gas | 1.08 | 1.71 |
| LPG | 9.83 | 11.05 |
| Gasoline (C5-150 deg. C.) | 14.5 | 14.16 |
| Heavy naphtha (150-216 deg. C.) | 6.82 | 6.11 |
| Light cycle oil (216-370 deg. C.) | 23.78 | 21.3 |
| Clarified oil (370 deg. C.+) | 31.3 | 29.95 |
| Coke | 12.6 | 15.62 |
| −216 deg. C. Conversion, wt % | 44.92 | 48.75 |
| CCR, wt % | 0 | 1.33 |

Adsorbent Clay-Silica shows reduction in coke (12.6 wt. %) yield when compare to Clay-Alumina-$La_2O_3$ system (15.62 wt. %). Also adsorbent Clay-Silica shows zero CCR in the liquid sample when compare to Clay-Alumina-$La_2O_3$ system (i.e. 1.33 wt. %).

Example-5

Activity and Selectivity of Adsorbent

Adsorbent A without metal was evaluated in ACE R+ unit under ROT of 550° C. and cat/oil 5.0 with respect to feed stock-1. The products were analyzed as per the procedure mentioned in Example-4. The product was also analyzed for CCR & metal content in it. This example illustrates that adsorbent without metal can remove CCR & metals (Ni&V) fully from the feed sample and is able to increase the propylene selectivity in LPG of 40%.

Adsorbent B with metals nickel 4000 ppm and vanadium 10500 ppm was evaluated in ACE R+MAT unit under ROT 550° C. & cat/oil 5.0 with respect to feed stock 1 & 2. The products were analyzed as per the procedure mentioned in Example-4. Adsorbent with metal can crack various hydrocarbon feed stocks having CCR 5.56 wt % and 10.37 wt % and able to increase the propylene selectivity in LPG of 47.78% and 37.60% (Table-9). The ethylene selectivity in dry gas could be achieved in the range of 26.3-30.59%.

TABLE 9

| | Description | | |
|---|---|---|---|
| | Feed-1 | Feed-1 Adsorbent | Feed-2 |
| | Adsorbent A | Adsorbent B | Adsorbent B |
| Metal on catalyst, ppm | | | |
| Ni | — | 4000 | 4000 |
| V | — | 10500 | 10500 |
| Temperature, deg. C. | 550 | 550 | 550 |
| WHSV, hr-1 | 24 | 24 | 24 |
| Cat/Oil | 5.0 | 5.0 | 5.0 |
| Yield, wt % | | | |
| Hydrogen | 0.09 | 0.04 | 0.25 |
| Dry gas | 1.08 | 2.7 | 1.02 |
| LPG | 9.83 | 4.27 | 3.46 |
| Gasoline (C5-150 deg. C.) | 14.50 | 13.72 | 7.05 |
| Heavy naphtha (150-216 deg. C.) | 6.82 | 5.47 | 3.96 |
| Light cycle oil (216-370 deg. C.) | 23.78 | 23.29 | 20.43 |
| Clarified oil (370 deg. C.+) | 31.30 | 39.48 | 45.83 |
| Coke | 12.60 | 11.03 | 18 |
| −216 deg. C. Conversion | 44.92 | 37.23 | 33.74 |
| Ethylene in Dry gas | 30.71 | 26.30 | 30.59 |
| Propylene in LPG | 40.00 | 47.78 | 37.60 |
| CCR, wt % | 0 | 0.05 | 0.19 |

Example-6

Combined Yield with Feed 2 & 3

Adsorbent B impregnated with metals nickel 4000 ppm and vanadium 10500 ppm was evaluated in ACE R+MAT unit under ROT 550° C., Feed-2 & cat/oil 5.0 and the products were analyzed as per the procedure mentioned in Example-4. The cracked liquid product were analyzed for CCR and metal and achieved the value of 0.19 wt % and <1 ppm. The cracked liquid products were collected and evaluated in fixed bed MAT unit in presence of Y-zeolite base catalyst, ZSM-5 additive and residue up gradation additive. The propylene selectivity in LPG could be achieved as 49.13% (Table-10). The ethylene selectivity in dry gas that could be achieved is 61.46%.

TABLE 10

| | Feed-2 | Feed-3 | Combined yield of Feed 2 & 3 |
|---|---|---|---|
| Metal on catalyst, ppm | | | |
| Ni | 4000 | Nil | |
| V | 10500 | Nil | |
| Catalyst | Adsorbent B | Catalyst (40%) + ZSM-5 additive (40%) + Residue upgrading additive (20%) | |
| Temperature, deg. C. | 550 | 580 | |
| WHSV, hr−1 | 24 | 59.14 | |
| Cat/Oil | 5.0 | 6.09 | |
| Yield, wt % | | | |
| Hydrogen | 0.25 | 0.24 | 0.25 |
| Dry gas | 1.02 | 13.44 | 6.43 |
| LPG | 3.46 | 31.57 | 15.70 |
| Gasoline (C5-150 deg. C.) | 7.05 | 21.44 | 13.31 |
| Heavy naphtha (150-216 deg. C.) | 3.96 | 10.67 | 6.88 |
| Light cycle oil (216-370 deg. C.) | 20.43 | 11.00 | 16.30 |
| Clarified oil (370 deg. C.+) | 45.83 | 2.14 | 26.76 |
| Coke | 18 | 9.75 | 14.39 |
| −216 deg. C. Conversion | 33.74 | 86.87 | 56.94 |
| Ethylene in Dry gas | 30.59 | 61.46 | |
| Propylene in LPG | 37.60 | 49.13 | |
| Other light olefin in LPG | 47.37 | 25.40 | |
| CCR, wt % | 0.19 | — | |
| Metal (Ni, V, Na, Fe), ppm | <1 | — | |

What claimed is:

1. An adsorbent for removal of con-carbon and contaminant metals in feed, said adsorbent consisting of:
    (a) clay in the range of 30-70 wt. %; and
    (b) silica in the range of 70-30 wt. %,
    wherein the adsorbent has a pore volume in the range of 0.25-0.45 cc/gm; a pore size in the range of 20 to 2000 Å; and a bi-modal pore size distribution characteristics, with a maximum of about 32% of the adsorbent having a pore size in the range of 20-200 Å and a minimum of about 68% of the adsorbent having a pore size in the range of 200-2000 Å.

2. The adsorbent as claimed in claim 1, wherein the clay is in the range of 35-65 wt. %, and silica is in the range of 65-35 wt. %.

3. The adsorbent as claimed in claim 1, wherein the clay is in the range of 40-50 wt. %, and silica is in the range of 60-50 wt. %.

4. The adsorbent as claimed in claim 1, wherein a maximum of 30% of the adsorbent have a pore size in the range of 20-200 Å and a minimum of 70% of the adsorbent having a pore size in the range of 200-2000 Å.

5. The adsorbent as claimed in claim 1, wherein the silica is formed/sourced from a group comprising of sodium silicate both neutral and alkaline, silicic acid, sodium or ammonium stabilized colloidal silica, or combination thereof.

6. The adsorbent as claimed in claim 1, wherein the clay is selected from a group comprising of kaolinite, bentonite, illite, vermiculite, smectite, dolomite, or combination thereof.

7. A process for preparing an adsorbent consisting of 30-70 wt. % of clay and 70-30 wt. % of silica, wherein the adsorbent has a pore volume in the range of 0.25-0.45 cc/gm; a pore size in the range of 20 to 2000 Å; and a bi-modal pore size distribution characteristics, with a maximum of 32% of the adsorbent having a pore size in the range of 20-200 Å and a minimum of 68% of the adsorbent having a pore size in the range of 200-2000 Å, said process comprising the steps of:
    (a) preparing a silica sol by adding source of silica to an acid;
    (b) preparing clay slurry by adding demineralized water containing dispersant;
    (c) adding a clay material to the silica sol so as to obtain a clay-silica slurry;
    (d) adding a pore regulating agent to the clay-silica slurry and forming shaped microsphere/extrudate from the same; and
    (e) calcining the shaped microsphere/extrudate so as to remove the pore regulating agent therefrom to thereby obtain the adsorbent.

8. The process as claimed in claim 7, wherein the source of silica is selected from a group comprising of sodium silicate both neutral and alkaline, silicic acid, sodium or ammonium stabilized colloidal silica, or combination thereof.

9. The process as claimed in claim 7, wherein the clay material is selected from a group comprising of kaolinite, bentonite, illite, vermiculite, smectite, dolomite, or combination thereof.

10. The process as claimed in claim 7, wherein the pore regulating agent is selected from a group comprising of acrylamide polymer, propylene oxide polymer, ethylene oxide polymer, polyvinyl alcohol, C12-C25 surfactants or combination thereof.

11. The process as claimed in claim 7, wherein the acid is selected from a group comprising of sulfuric acid, nitric acid, hydrochloric acid, formic acid or combination thereof.

12. The process as claimed in claim 7, wherein the silica sol is prepared by adding source of silica to an acid under controlled temperature between 10-30° C. with pH below 3.

13. The process as claimed in claim 7, wherein the dispersant is sold under the trademark TAMOL™, which is neutral sodium salt of a condensed arylsufonic acid.

* * * * *